US009021205B2

(12) United States Patent
Weiner

(10) Patent No.: US 9,021,205 B2
(45) Date of Patent: Apr. 28, 2015

(54) PAGE REPLACEMENT IN CACHE MEMORY

(71) Applicant: Red Hat, Inc., Raleigh, NC (US)

(72) Inventor: Johannes Weiner, Princeton, NJ (US)

(73) Assignee: Red Hat, Inc., Raleigh, NC (US)

( * ) Notice: Subject to any disclaimer, the term of this patent is extended or adjusted under 35 U.S.C. 154(b) by 308 days.

(21) Appl. No.: 13/690,191

(22) Filed: Nov. 30, 2012

(65) Prior Publication Data

US 2014/0156940 A1    Jun. 5, 2014

(51) Int. Cl.
G06F 12/00    (2006.01)
G06F 13/00    (2006.01)
G06F 13/28    (2006.01)
G06F 12/12    (2006.01)
G06F 12/08    (2006.01)
G06F 11/34    (2006.01)

(52) U.S. Cl.
CPC .......... *G06F 12/122* (2013.01); *G06F 12/121* (2013.01); *G06F 12/123* (2013.01); *G06F 12/0802* (2013.01); *G06F 2201/885* (2013.01); *G06F 11/3452* (2013.01)

(58) Field of Classification Search
CPC . G06F 12/123; G06F 12/0802; G06F 12/121; G06F 11/3452; G06F 2201/885
USPC .......................... 711/118, 133–134, 154, 159
See application file for complete search history.

(56) References Cited

U.S. PATENT DOCUMENTS

| 5,432,919 | A  | * | 7/1995 | Falcone et al. ................. 711/134 |
| 6,282,613 | B1 | * | 8/2001 | Hsu et al. ....................... 711/118 |
| 7,526,614 | B2 |   | 4/2009 | van Riel |
| 7,685,369 | B2 |   | 3/2010 | van Riel |
| 2007/0124540 | A1 | * | 5/2007 | van Riel ........................ 711/133 |
| 2007/0124560 | A1 | * | 5/2007 | van Riel ........................ 711/216 |
| 2007/0180215 | A1 | * | 8/2007 | Cascaval et al. .............. 711/202 |

OTHER PUBLICATIONS

Ding, Chen, Reuse Distance Analysis, Feb. 2001, University of Rochester.*

* cited by examiner

*Primary Examiner* — Ryan Bertram
(74) *Attorney, Agent, or Firm* — Lowenstein Sandler LLP

(57) ABSTRACT

A mechanism for page replacement for cache memory is disclosed. A method of the disclosure includes referencing an entry of a data structure of a cache in memory to identify a stored value of an eviction counter, the stored value of the eviction counter placed in the entry when a page of a file previously stored in the cache was evicted from the cache, determining a refault distance of the page of the file based on a difference between the stored value of the eviction counter and a current value of the eviction counter, and adjusting a ratio of cache lists maintained by the processing device to track pages in the cache, the adjusting based on the determined refault distance.

20 Claims, 8 Drawing Sheets

PAGE REPLACEMENT IN CACHE MEMORY

TECHNICAL FIELD

The embodiments of the disclosure relate generally to computer memory management and, more specifically, relate to page replacement in cache memory.

BACKGROUND

Memory management is a fundamental issues of modern computer systems. Typically, a computer system includes a hierarchy of memory that ranges from a small, fast cache of main memory that is placed in front of a larger, but slower, auxiliary memory. The cache is generally implemented using a physical memory, such as Random Access Memory (RAM), while the auxiliary memory is implemented using a storage device, such as a disk drive or hard disk. Both memories are usually managed in uniformly sized units known as pages. Because of their impact on performance, caching algorithms that manage the contents of the main memory aid in the efficiency of a computer system, server, storage system, and operating system.

Page replacement is a technique for maximizing the utility of a system's available memory by caching the "right data" from much slower secondary storage. The "right data" is called the working set, which is data that is currently in use by applications and is likely be needed in the near future. Page replacement algorithms try to detect what is part of the working set by observing memory access patterns. When available page frames are fully occupied with cached pages and an application needs to access an uncached page of data from the disk, the page replacement policy in the operating system should determine the optimal candidate page to be evicted from memory in order to reuse its page frame for the new page.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for a mechanism for page replacement in cache memory. In one embodiment, the page replacement mechanism optimizes a double clock list cache implementation of an OS of a computer system by maintaining information on cache pages that were evicted from the cache memory of the computer system. This information is known as the "refault distance" and indicates that number of pages that were evicted from the cache between a page's eviction and the same page's refault back into the cache. The refault distance information is stored in a cache tree data structure used by the caching mechanism to index the cache. In one embodiment, a value of a global eviction counter at the time that page was evicted is stored in an empty slot of the cache tree data structure left by the page when it was evicted. Based on the refault distance of the page, the ratio between the double clock lists of the cache may be adjusted.

In one embodiment, a method of embodiments of the disclosure includes referencing an entry of a data structure of a cache in memory to identify a stored value of an eviction counter, the stored value of the eviction counter placed in the entry when a page of a file previously stored in the cache was evicted from the cache. The method also includes determining a refault distance of the page of the file based on a difference between the stored value of the eviction counter and a current value of the eviction counter. The method further includes adjusting a ratio of cache lists maintained by the processing device to track pages in the cache, the adjusting based on the determined refault distance.

Figure 1:
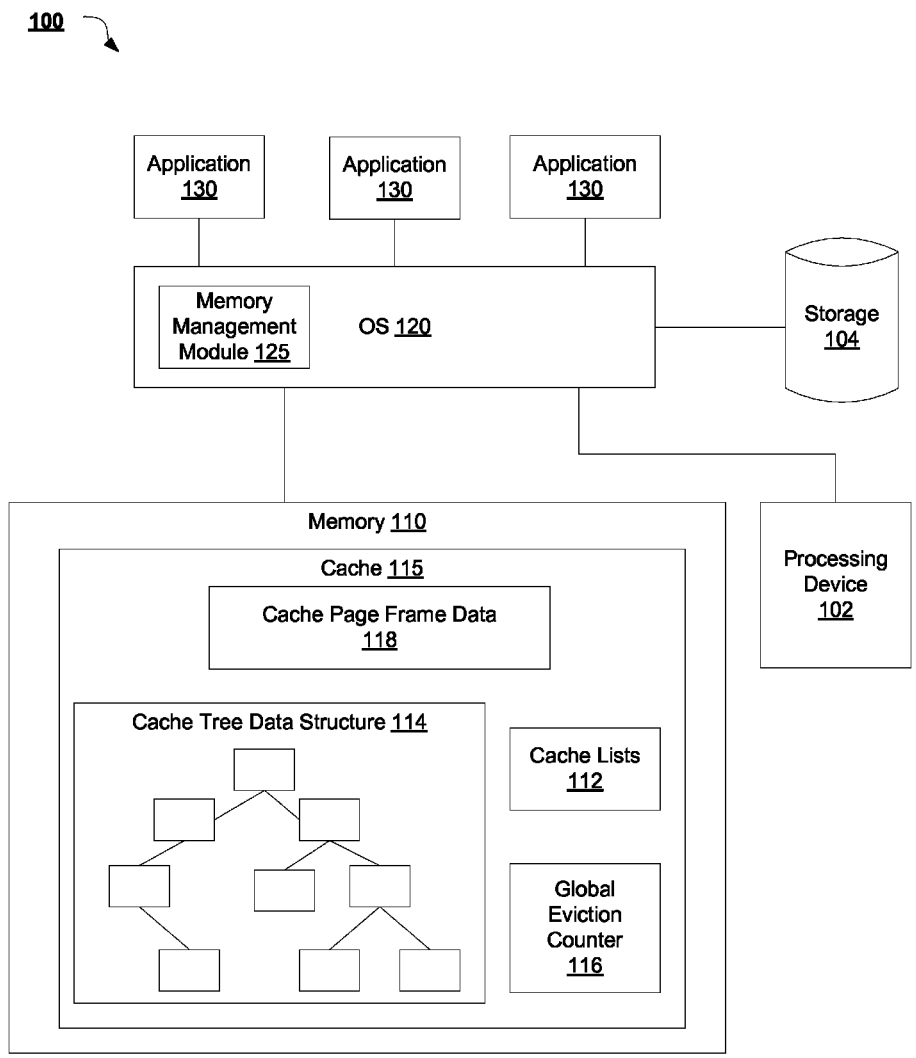
FIG. 1 is a block diagram of a computer system in which embodiments of page replacement for cache memory may be performed.

FIG. 1 is a block diagram of a computer system 100 in which embodiments of page replacement for cache memory may be performed. In general, computer system 100 may include a desktop computer, a server machine, a workstation, a mobile device such as a mobile phone, a tablet device, and the like. For purposes of explanation, computer system 100 is shown as a general purpose computer system. Computer system 100 may include a processing device 102, a storage device 104 (such as a disk drive or hard disk), and a memory 110.

Computer system 100 may also include an operating system (OS) 120 that is executable by the processing device 102 from memory 110. OS 120 is a collection of routines and programs that service sequencing and processing of applications 130 running on computer system 100, such as resource allocation, scheduling, input/output (I/O) control, and memory management. OS 120 may include software, hardware, and/or firmware implementations, or any combination of the above. Computer system 100 may also include a variety of other components that are not shown, such as multiple processing devices, additional storage devices, I/O devices (such as keyboard, mouse, and display), a communications bus, and so on.

In one embodiment, memory 110 includes a cache 115 for storing information that is frequently-accessed from storage 104. Cache 115 may be an on-chip cache or an external cache that is used as a "transparent" buffer of disk-backed (e.g., storage 104-backed) pages 118 kept in memory 110 by the OS 120 for quicker access. OS 120 may utilize cache 115 to retrieve and store pages from storage 104 that are frequently and/or recently accessed by OS 120. These pages are indicated as cache page frame data 118 in FIG. 1.

In one embodiment, OS 120 includes a memory management module 125 that may maintain several data structures for managing data 118 held in cache 115 and track relevant information for applications 130 from storage 104. The data structures may include cache lists 112, a cache tree data structure 114, and a global eviction counter 116.

In one embodiment, cache lists 112 are lists used by memory management module 125 as part of page replacement techniques to identify pages 118 to be evicted from the cache 115, such as when the cache 115 is full and a new page is faulted into cache 115.

Figure 2:
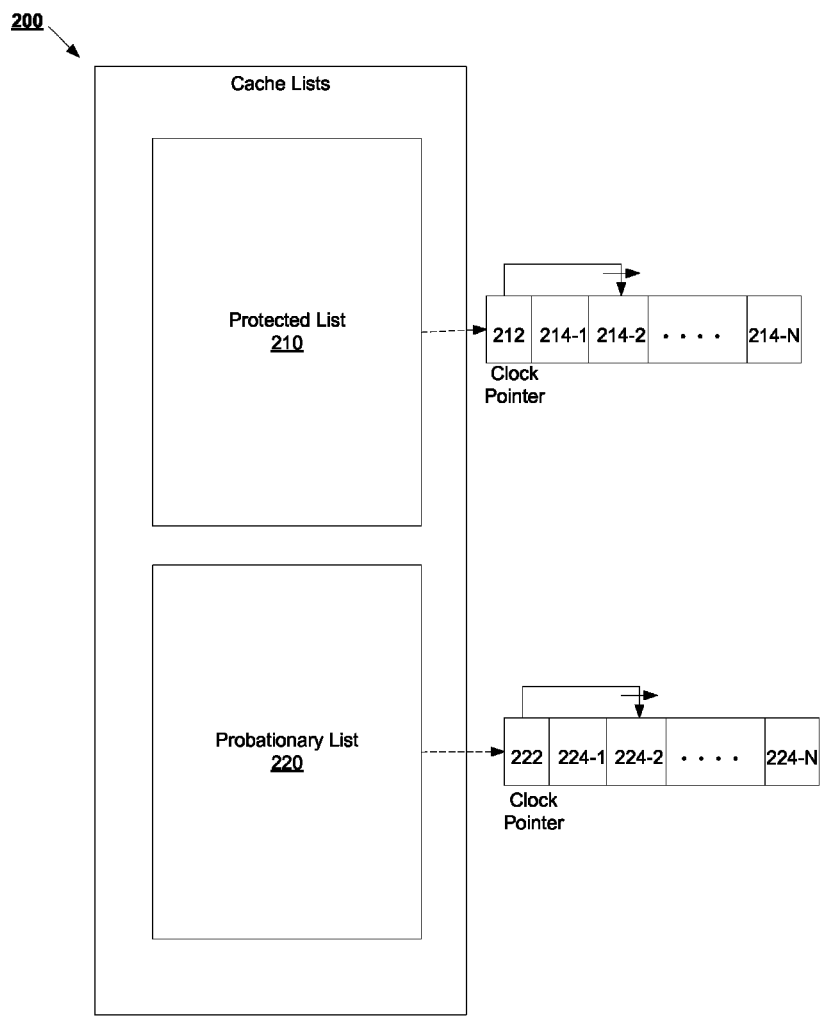
FIG. 2 is a block diagram depicting an example of cache lists that are used for page replacement purposes according to an embodiment of the disclosure.

FIG. 2 is a block diagram depicting an example of cache lists 200 that are used for page replacement purposes according to an embodiment of the disclosure. In one embodiment, cache lists 200 are the same as cache lists 112 of FIG. 1. In one embodiment, cache lists 200 are, when combined together, sized according to the size of the cache (such as cache 112 of FIG. 1) that the cache lists 200 represent. The cache lists include a protected list 210 and a probationary list 220. The protected list 210 and probationary list 220 are data structures used by a memory management module for tracking pages stored in a cache.

In one embodiment, when a page faults into the cache, it is initially placed into the probationary list 220. After a predetermined number of accesses of the page from the probationary list 220, the page may be moved into the protected list 210. In embodiments of the disclosure, when a page is evicted from the protected list 210, the page is not removed entirely from the cache, but instead is demoted to the probationary list 220. On the other hand, pages evicted from the probationary list 220 may be removed from the cache entirely.

In one embodiment, the protected list 210 and the probationary list 220 may be implemented as clock lists, also known as circular buffers or arrays. A circular buffer or array is a data structure that uses a single, fixed-size buffer as if it were connected end-to-end. Each clock list for the protected list 210 and the probationary list 220 includes a clock pointer 212, 222 and a set of entries 214-1-214-N, 224-1-224-N. Entries 214-1-214-N, 224-1-224-N may include entries that represent pages in the associated cache (e.g., cache 112). In some embodiments, entries 214-1-214-N, 224-1-224-N are derived by hashing the mapping and offset of the page with an inode number to which the page belongs. The inode number is an integer number that identifies a metadata data structure describing an associated file. This results in a unique identifier for the page for use in entries 214-1-214-N, 224-1-224-N. Other techniques for generating a unique ID for a page may also be utilized.

Clock pointer 212, 222 is a pointer to the currently least accessed or oldest page in the list 210, 220. As pages are moved from the respective list 210, 220, the oldest entry pointed by clock pointer 212, 22 is overwritten. Clock pointer 212, 222 is then advanced to the next oldest entry in the list 210, 220.

Referring back to FIG. 1, in one embodiment, pages 118 stored in the cache 115 are organized in a tree data structure 114 in order to quickly look up the pages when an application 130 asks for the pages. Each slot in the cache tree data structure 114 holds either nothing (no data present) or a pointer to a page descriptor for the page 118. An offset of a page in an associated file of the page may be used as in index into the tree data structure 114 of cache 115 to locate the slot for the page in the tree data structure. When cache pages are evicted from memory 110, they leave empty slots in that tree. In one embodiment, the empty tree slots are then used to store a value of a global eviction counter 116 at the time of the eviction. The global eviction counter 116 increments each time a page is evicted from cache 115.

In embodiments of the disclosure, as part of accessing a page, the memory management module 125 references the cache 115, and specifically, the tree data structure 114 of the cache 115, to determine whether the page is already stored in the cache 115. The offset of the page (in the file of the page) may be used to index into the cache tree data structure 114 and determine if the page is in cache 115. In one embodiment, if the page is not in cache 115, but has been previously evicted from the cache, the memory management module 125 encounters the empty tree slot for the page that includes the stored value of the global eviction counter 116 at the time of the page's previous eviction.

The memory management module 125 may then utilize the stored global eviction counter value to determine a "refault distance" of the page. The refault distance indicates that number of pages that were evicted from the cache 115 between a page's eviction and the same page's re-entry (i.e., fault) back into the cache 115. In one embodiment, the refault distance for a particular page may be determined by calculating the difference between the current value of the global eviction counter 116 and the snapshot of the global eviction counter stored in the page's empty tree slot in the cache tree data structure 114.

In embodiments of the disclosure, based on the determined refault distance of the page, a ratio between the protected list 210 and the probationary list 220 of the cache lists 112 may be tuned. In one embodiment, when the determined refault distance of the page is smaller than a potential for growth of the probationary list 220 (e.g., number of pages n the protected list 210), then the probationary list 220 is increased. The probationary list 220 may be increased by adding entries to probationary clock list 220, while taking the same number of entries away from the protected clock list 210.

In one embodiment, the probationary list 220 is increased by one entry when the refault distance is smaller than the potential for growth of the probationary list 220. In other embodiments, the probationary list 220 may be increased by more than one entry, such as by an amount that is a function of the determined refault distance of the page, but no larger than the amount that the probationary list 220 can expand with reference to the protected list 210.

In one embodiment, when the probationary list 220 is increased, the entries from the protected list 210 that are demoted (due to the corresponding decrease of the protected list 210) are taken from the tail of the protected clock list 210 and added to the head of the probationary clock list 220, along with the refaulting page. As a result, frequently-used pages from the protected list 210 have the opportunity to be promoted back into the protected list 210 (i.e., from subsequent access of the page in the probationary list 220) without being removed from the cache 112 entirely. At the same time, the probationary list 220 may be expanded to address an imbalance in the ratio between the protected 210 and probationary 220 cache lists which may aid in preventing thrashing of pages at the cache 112. When the determined refault distance of a page is larger than the potential for growth of the probationary list 220, then embodiments of the disclosure ignore the refault distance for purposes of tuning the ratio between protected and probationary cache lists.

Figure 3:
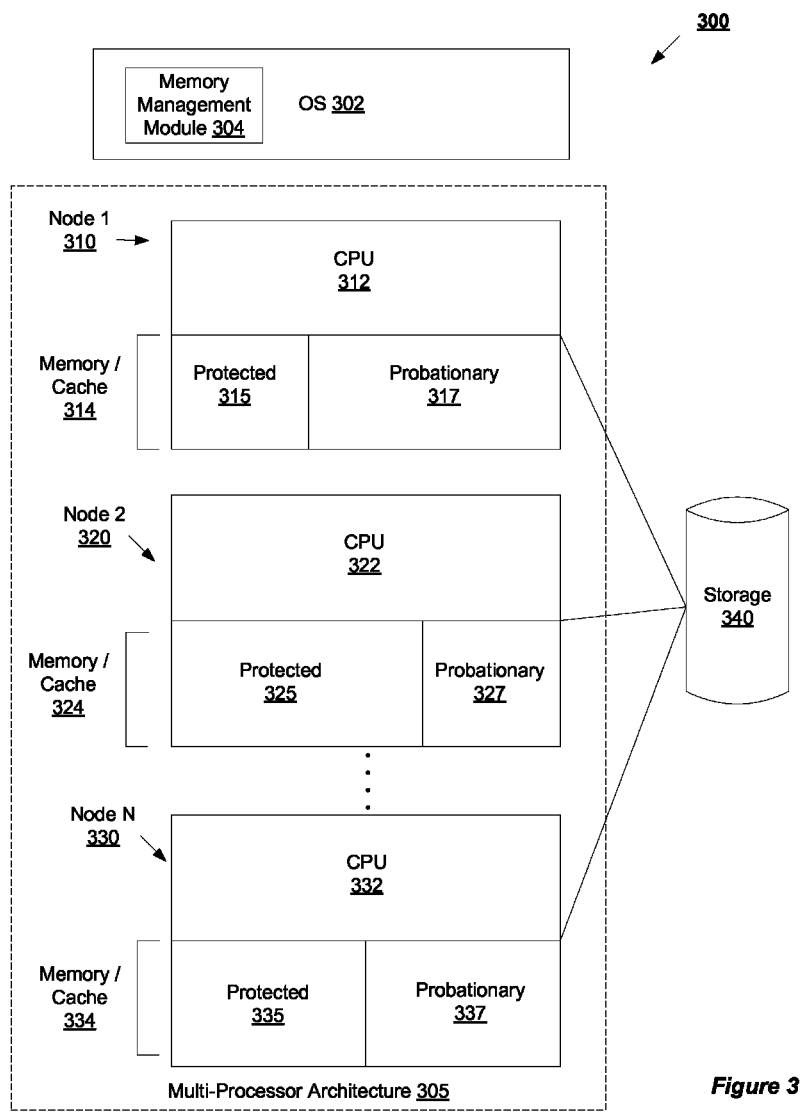
FIG. 3 is a block diagram depicting a multi-processor computer system having multiple nodes implementing a non-uniform memory access (NUMA) architecture according to an embodiment of the disclosure.

FIG. 3 is a block diagram depicting a multi-processor computer system 300 having multiple nodes implementing a non-uniform memory access (NUMA) architecture according to an embodiment of the disclosure. In one embodiment, computer system 300 implements page replacement for cache memory described herein. Computer system 300 includes an OS 302 executable from a multi-processor architecture 305. In one embodiment, OS 302 is the same as OS 120 of FIG. 1.

The multi-processor architecture 305 includes multiple nodes 1-N 310-330 each having its own CPU 312, 322, 332 and memory 314, 324, 334, but sharing the same secondary access storage device 304 (e.g., one or more disk drives or hard disks, directly attached or networked). The memory 314, 324, 334 of each node 310, 320, 330 includes a cache divided into a protected list 315, 325, 335 and a probationary list 317, 327, 337. In one embodiments, protected lists 315, 325, 335 are the same as protected list 210 of FIG. 2, and probationary lists 317, 327, 337 are the same as probationary list 220 of FIG. 2.

In one embodiment, OS 320 includes a memory management module 304. Memory management module 304 may be the same as memory management module 125 of FIG. 1. However, instead of managing cache data structures for a single cache memory, memory management module 304 manages cache data structures 314, 324, 334 for all of the multiple nodes 310, 320, 330 of multi-processor architecture 305. In one embodiment, each node 310, 320, 330 operates similarly, in terms of memory management and page replacement, as memory 110 described with respect to FIGS. 1 and 2. However, in the NUMA architecture implemented by multi-processor architecture 305, the memory management module 304 may further account for the multiple nodes 310, 320, 330 having individual memory and cache structures 314, 324, 334.

Generally, in a NUMA system, the memory management module 304 aims to allocate memory from the same node the allocating task is executing on, in order to avoid costly foreign memory access costs. This is because it is cheaper (in terms of efficiency, time, processing tasks, etc.) to access in-node memory versus neighboring node memory. However, accessing neighboring node memory is cheaper than accessing the secondary storage device 340.

As such, embodiments of the disclosure detect, during memory allocation, if the local memory 314, 324, 334 of the node 310, 320, 330 is capable of and optimized to hold a working set of data for a current application by translating the global refault distance to a local node refault distance. This local node refault distance is then compared to memory that could be made available through expanding the probationary clock 317, 327, 337 that the page was evicted from (at the cost of the protected clock 315, 325, 335) at that local node. If the local refault distance is greater than the amount of memory that could made available for expanding the probationary clock 317, 327, 337, then the memory management module 304 expands the search for optimized available memory to neighboring nodes 310-330 in the multi-processor architecture 305, similar as discussed above with respect to FIG. 1.

In one embodiment, the memory management module 304 maintains a global eviction counter and per-node eviction counters (not shown). The global refault distance may be translated to a local refault distance on a per-node basis by scaling the global distance to the per-node proportion. For example, the following function illustrates such a scaling operation:

local_refault=[(global_evictions−eviction_snapshot)
*node_evictions]/global_evictions, where:
local_refault is the local refault value for a node,
global_evictions is the current value of the global eviction counter,
eviction_snapshot is the value of the global eviction counter that was stored in empty page slot of the cache tree data structure when the page was evicted, and
node_evictions is the current value of the local node eviction counter.

In one embodiment, the memory management module 304 takes into account changes in applications that run on the computer system 300 and temporary imbalances between nodes 310-330 (applications moving around between nodes) by decaying the per-node proportion over time. This means that recent evictions are more represented in the local node eviction counter than older evictions, which are eventually forgotten. The speed of decay may be established by an administrator of the computer system 300 or set to a default value by the OS 302. The speed of decay is utilized to shorten the adjustment time of the page replacement implemented by memory management module 304 to new input. For example, if an application has been running for hours and reclaimed many pages on one node only, the proportion would be heavily biased toward that node. Because that proportion stands for the load a node is experiencing, without decay it would take a long time to recognize when another node is subsequently put under heavy load.

In one example of page replacement implemented by the memory management module 304 in a multi-processor system with a NUMA architecture, assume there is a refault distance of two for a faulted page that was previously evicted from the cache 314 of node 1 310. This refault distance of two indicates that one page was evicted after the refaulting page. Accordingly, if there had been two extra slots in the probationary queue 317, the page access would not have been a cache miss but instead would have promoted the page to the protected list 315. As such, the memory management module 304 checks whether there is room to expand the probationary clock list 317 by two pages, and thereby avoid cache misses.

On the other hand, if the refault distance is higher than the potentially available memory on the local node 310, the cache miss would have been unavoidable. As such, the memory management module 304 expands its search to foreign neighboring nodes (e.g., node 2 320-node N 330) memories 324, 334 to attempt to avoid further cache misses. The memory management module 304 first checks to balance cache lists of cache 314 on the local node, and then, if that is not an option, checks foreign nodes 320, 330 for re-balancing purposes. In one embodiment, the memory management module 304 maintains, for each individual node 310-330, a hierarchy of nodes that are checked in a particular order for cache memory clock list re-balancing purposes.

Figure 4A:
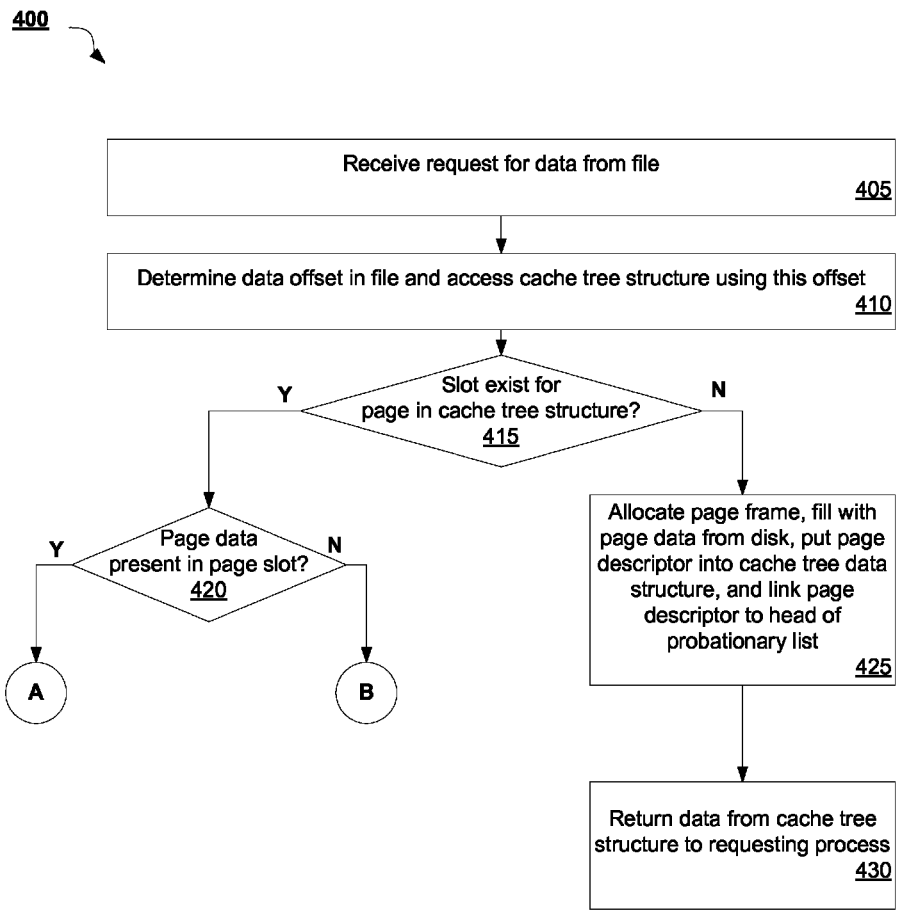
FIGS. 4A, 4B, and 4C are flow diagrams illustrating a method for page replacement for a cache memory according to an embodiment of the disclosure.
Figure 4B:
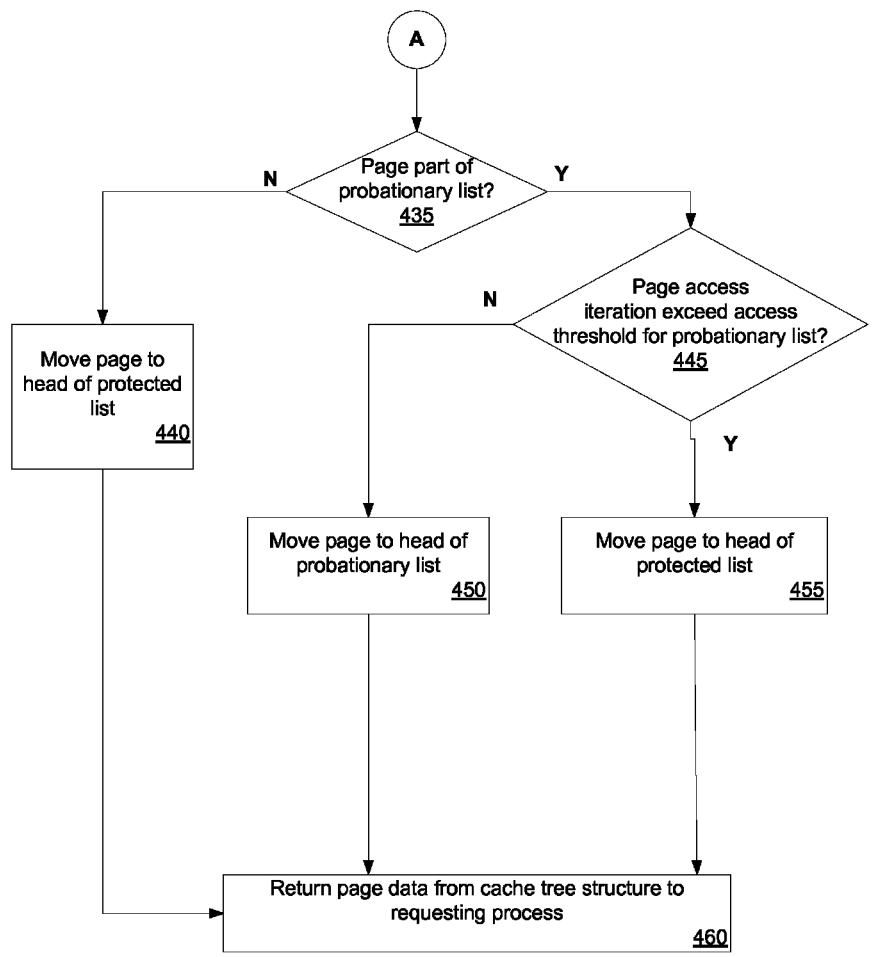
Figure 4C:
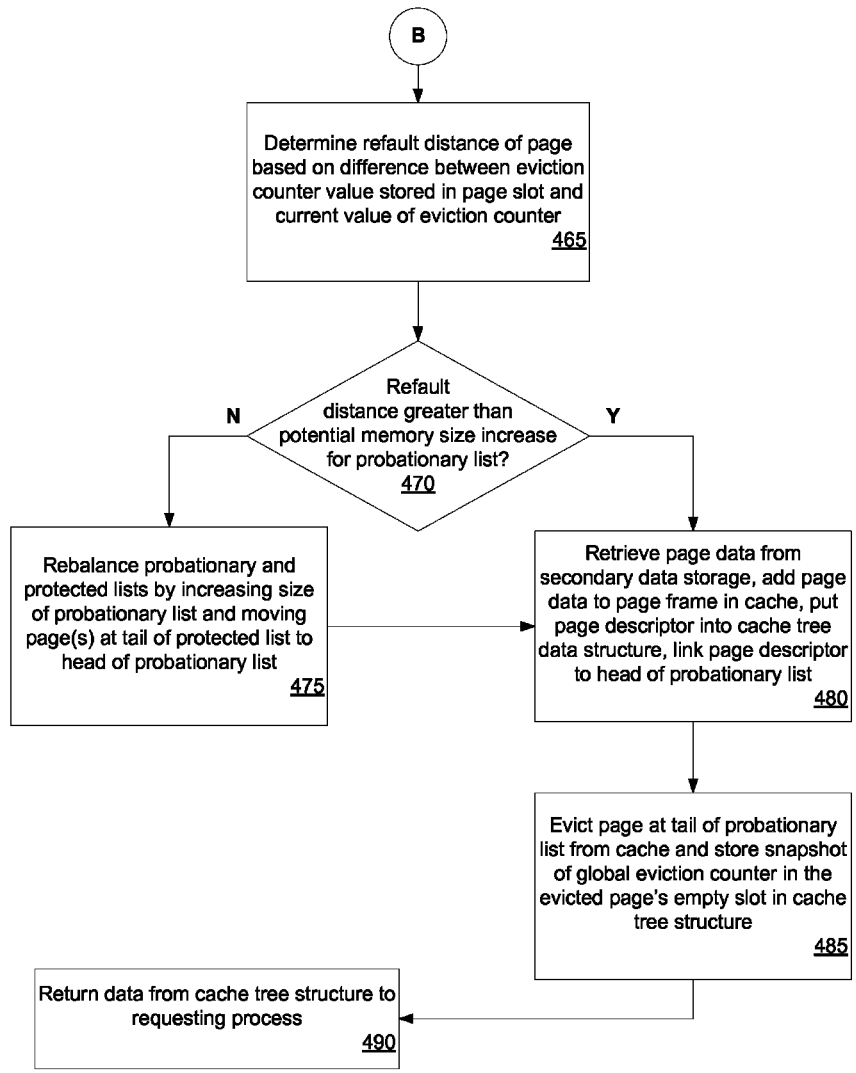

FIGS. 4A, 4B, and 4C are flow diagrams illustrating a method 400 for page replacement in a cache memory according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by memory management module 125 of computer system 100 of FIG. 1.

Method 400 begins at block 405 in FIG. 4A where a request for data from a file is received. In one embodiment, the request is from a process of an application executed on the computer system. At block 410, an offset of data in the file is determined and used to index into a cache tree data structure of a cache in the memory of the computer system. At decision block 415, it is determined whether a slot exists for a page representing the requested data at the indexed location in the cache tree data structure.

If not, then method 400 proceeds to block 425 where a new page frame is allocated for the page in the cache and the new page frame is filled with page data that is retrieved from secondary data storage, such as a hard disk or disk drive communicably coupled to the computer system (directly attached or networked). Furthermore, a page descriptor is placed into the cache tree data structure and the page descriptor is then linked to the head of the probational list of the cache lists of the cache. Then, at block 430, the page data from the cache is then returned to the requesting process.

On the other hand, if a slot is found at the indexed location in the cache tree data structure at decision block 415, then method 400 proceeds to decision block 420 to determine if actual page data is present in the page slot. If so, then method 400 proceeds to decision block 435 of FIG. 4B. If not, then method 400 proceeds to block 465 of FIG. 4C.

Referring to FIG. 4B, decision block 435 is performed when there is page data present in the indexed page slot of the cache tree data structure. At decision block 435, it is determined whether the page represented at the indexed location is part of a probationary list maintained for the cache of the cache tree data structure. In one embodiment, the probationary list is part of a double clock list structure maintained by the memory management module to track pages stored in the cache in terms of frequency and timing (i.e., how recent) of access to the page. The probationary list may be complimented by a protected list, both of which together track the working set of pages maintained in the cache and are implemented as clock lists, also known as circular buffers or arrays. Each list includes a pointer that indicates the most recently accessed page in the list and that rotates around the list based on page access in the list.

If the page is not part of the probationary list at decision block 435, then method 400 proceeds to block 440 where the page is determined to be part of the protected list and is then moved to the head of the protected list, as it was the most recently accessed page in that list. Then, at block 460, the page data from the indexed location in the cache tree data structure is returned to the requesting process.

If the page is part of the probationary list at decision block 435, then method 400 proceeds to decision block 445 where it is determined whether the accessed data indicates that the number of page accesses for the cache entry exceeds an access threshold. In one embodiment, the access threshold is a predetermined number of accesses that determines when a page should be moved from the probationary list to the protected list of the cache. A system administrator may set this value or it may be programmed to a default value by the OS of the computer system. The page access information may be stored in a page descriptor structure representing the page frame and the page data it stores.

If the page access iterations from the cache exceed the access threshold, then method 400 continues to block 455 where the page is moved to the head of the protected list. If the page access iterations do not exceed the access threshold, then method 400 proceeds, optionally, to block 450 where the page is moved to the head of the probationary list. In some embodiments, the page may remain in the same spot in the probationary list when repeatedly accessed below the access threshold. In either case, method 400 proceeds to block 460 where page data from the indexed cache tree structure is returned to a requesting process.

Referring to FIG. 4C, block 465 is performed when there is not page data present in the indexed page slot of the cache tree data structure at decision block 410 of FIG. 4A. In this situation, the page had been previously cached and evicted from the cache. At block 465 a refault distance of the page is determined based on a difference between a stored value of global eviction counter and a current value of the global eviction counter. In one embodiment, the value of the global eviction counter was recorded at the time of the eviction and stored in the page slot for the page upon its eviction from the cache. The calculated refault distance indicates the number of pages that have been evicted from the page between the eviction of the page and the page's current refault back into the cache.

Subsequently, at decision block 470, it is determined whether the refault distance of the page is greater than a potential memory size increase for the probationary list. This potential memory size increase comes at the expense of the protected list, as the combination of the two lists share the total size of the cache. Taking from one list increases the other list, and vice versa. If the refault distance is not greater (i.e. smaller than or equal to) than the potential memory size increase for the probationary list, then method 400 proceeds to block 475 where the probationary and protected lists are rebalanced.

In one embodiment, rebalancing the protected and probationary lists includes increasing the size of the probationary list by one or more entries. The probationary list size is increased by removing entries from the tail of the protected list to the head of the probationary list. The number of entries to move to the probationary list may be determined by a system administrator or may be a function of the refault distance. Method 400 then proceeds to block 480, described further below.

If the refault distance is greater than the potential memory size increase at decision block 470, then method 400 also proceeds directly to block 480. At block 480, the requested page data is retrieved from the secondary data storage. This retrieved page data is added to a page frame in the cache. A pointer to the page descriptor associated with the page frame is then linked to the head of the probational list of the cache lists for the cache. Furthermore, at block 485, a page entry at the tail of the probationary list is evicted from the cache and a snapshot of the global eviction counter is stored in the evicted page's empty page slot in the cache tree data structure. In one embodiment, block 485 is performed when the memory is full. Otherwise, block 485 may be optional. Lastly, at block 490, the page data from the indexed cache tree structure is returned to a requesting process.

Figure 5:
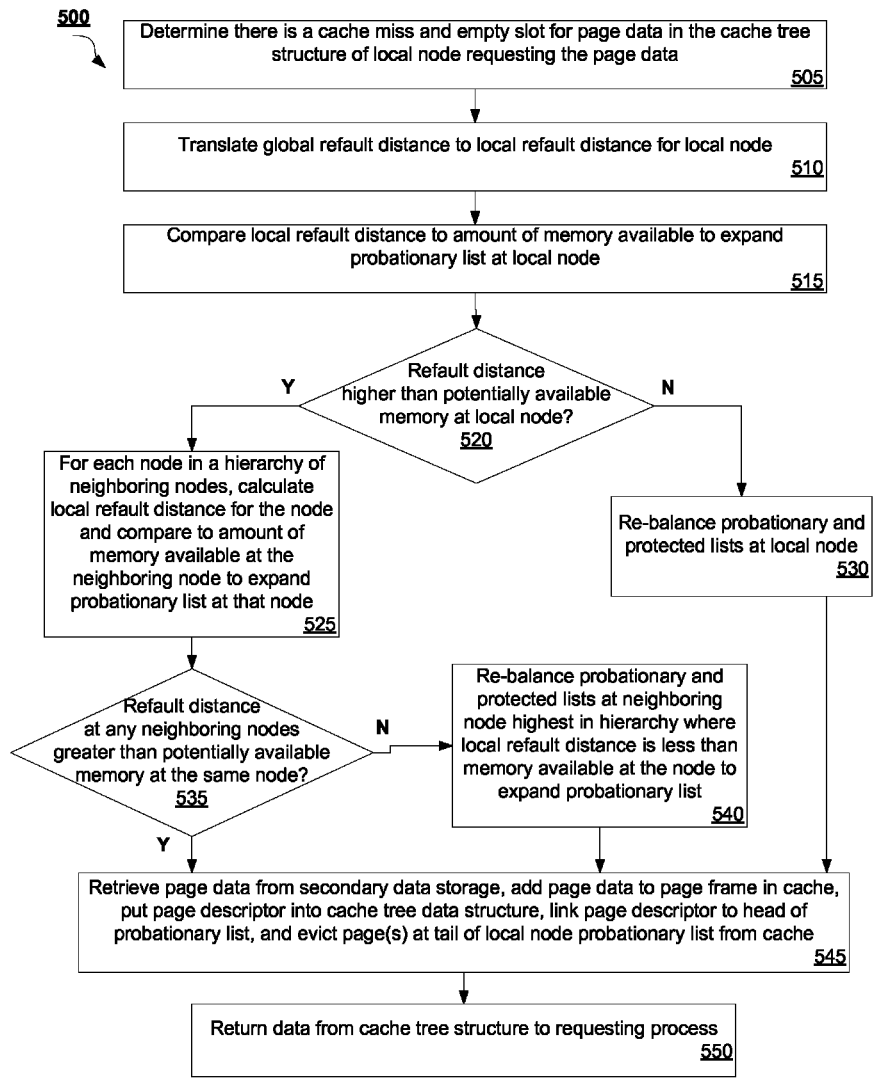
FIG. 5 is a flow diagram illustrating a method for page replacement for a cache memory in a multi-processor system implementing NUMA architecture according to an embodiment of the disclosure.

FIG. 5 is a flow diagram illustrating a method 500 for page replacement for a cache memory in a multi-processor system implementing NUMA architecture according to an embodiment of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by memory management module 304 of computer system 300 of FIG. 3.

Method 500 begins at block 505 where it is determined that a cache miss for requested data has occurred and that there is an empty slot for the page representing the requested data in a cache tree data structure of a local node hosting a process requesting the data. At block 510, a global refault distance is translated into a local refault distance for the local node. The global refault distance may be translated to a local refault distance on a per-node basis by scaling the global distance to a per-node proportion (based on local evictions at the node), as previously described above with respect to FIG. 3.

Then, at block 515, the local refault distance is compared to an amount of memory available for expanding the probationary list at the local node. In one embodiment, the memory available for expanding the probationary list comes at the expense of the protected list at the local node. At decision block 520, it is determined, based on the comparison, whether the local refault distance is higher than the potentially available memory for expanding the probationary list at the local node. If so, then method 500 proceeds to block 525, discussed further below.

If not, then method 500 proceeds to block 530, where the probationary list and protected list at the local node are rebalanced. In one embodiment, rebalancing the protected and probationary lists includes increasing the size of the probationary list by one or more entries, and removing the same number of entries from the tail of the protected list to the head of the probationary list. The number of entries to move to the probationary list may be determined by a system administrator or may be a function of the refault distance. Method 500 then proceeds to block 545 discussed further below.

With respect to block 525, where the refault distance is higher than the potentially available memory amount, a local refault distance is calculated for neighboring nodes in the multi-processor system. In one embodiment, a hierarchy of nodes is referenced to determine an order of the neighboring nodes to use when performing the calculations. Each neighboring node is considered one at a time in the indicated order, and a local refault distance is calculated at that node and compared to the amount of memory available at the particular node for expanding the node's probationary list. The calculation and comparison is repeated until a refault distance at a neighboring node is found to be smaller than the amount of memory available at the particular node for expanding the node's probationary list, or until all neighboring nodes have been considered and none have a small enough refault distance to satisfy the comparison, as shown at decision block 535.

If a neighboring node is found to have a smaller refault distance than potentially available memory for expanding the probationary list at that node, then method 500 continues to block 540, where the probationary list and protected list at the neighboring node (having the smaller refault distance as compared to potential available memory for probationary list expansion) are rebalanced. In one embodiment, rebalancing the protected and probationary lists includes increasing the size of the probationary list by one or more entries, and removing the same number of entries from the tail of the protected list to the head of the probationary list. The number of entries to move to the probationary list may be determined by a system administrator or may be a function of the refault distance.

Method 500 then continues to block 545 where the requested page data is retrieved from the secondary data storage. This retrieved page data is added to a new allocated page frame in the cache (at the local node or at the neighboring node depending on the flow through method 500) and an identifier of the page is also placed in the cache tree data structure and linked to the head of the probationary list for that node.

Furthermore, a page entry at the tail of the probationary list is evicted from the cache and a snapshot of the global eviction counter is stored in the evicted page's empty page slot in the cache tree data structure. In some embodiments, more than one page entry from the tail of the probationary list may be evicted from the cache when memory is added for the new page. Lastly, at block 550, the page data from the indexed cache tree structure is returned to a requesting process.

Figure 6:
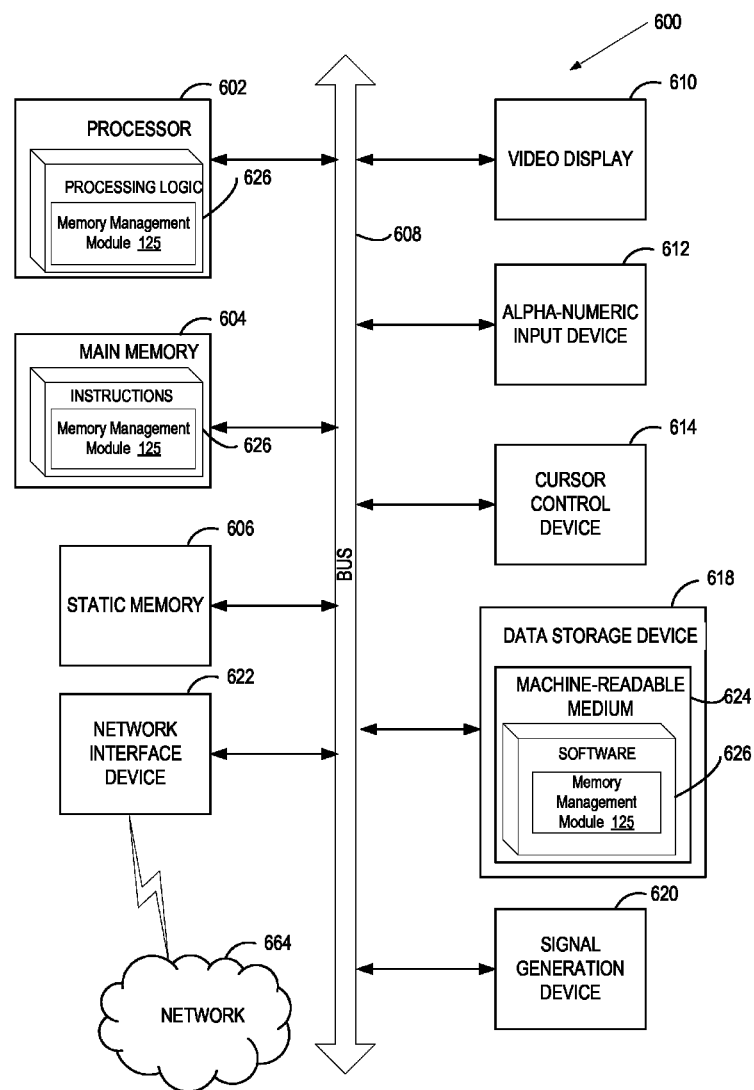
FIG. 6 illustrates a block diagram of one embodiment of a computer system.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored software 626 embodying any one or more of the methodologies of functions described herein. For example, software 626 may store instructions to implement a memory management module 125 described with respect to FIG. 1. The software 624 may also reside, completely or at least partially, within the main memory 604 and/or within the processing device 602 during execution thereof by the computer system 600; the main memory 604 and the processing device 602 also constituting machine-accessible storage media.

The machine-readable storage medium 628 may also be used to store instructions 626 to implement a remote access protocol server 125 to perform page replacement for cache memory in a computer system, such as the computer system described with respect to FIGS. 1 through 3, and/or a software library containing methods that call the above applications. While the machine-accessible storage medium 628 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

In the foregoing description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "adjusting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
   referencing, by a processing device, an entry of a data structure of a cache in memory to identify a stored value of an eviction counter, the stored value of the eviction counter placed in the entry when a page of a file previously stored in the cache was evicted from the cache;
   determining, by the processing device, a refault distance of the page of the file in view of a difference between the stored value of the eviction counter and a current value of the eviction counter; and
   adjusting, by the processing device, a ratio of cache lists maintained by the processing device to track pages in the cache, the adjusting in view of the determined refault distance.

2. The method of claim 1, wherein the refault distance indicates a number of pages that were evicted from the cache in between the eviction of the page and a faulting of the page back into the cache.

3. The method of claim 1, wherein the cache lists comprise a protected list and a probationary list.

4. The method of claim 3, further comprising:
   determining whether the refault distance of the page is smaller than or equal to a number of pages that a size of the probationary list can increase, wherein the number of pages that the size of the probationary list can increase is equal to a size of the protected list; and
   when the refault distance is smaller than or equal to the number of pages that the size of the probationary list can increase, performing the adjusting the ratio.

5. The method of claim 3, wherein when the refault distance is greater than the number of pages that the size of the probationary list can increase, leaving the ratio of the protected list and the probationary list in a current state of the ratio.

6. The method of claim 1, wherein the data structure of the cache is a tree data structure, and wherein an offset of the page in the file is used as an index into the tree data structure to reference the entry for the page.

7. The method of claim 3, wherein the adjusting the ratio further comprising increasing the probationary list by at least one entry by moving at least one entry at a tail of the protected list to a head of the probationary list.

8. The method of claim 6, further comprising adding an entry for the page to the head of the probationary list.

9. The method of claim 1, wherein the eviction counter is incremented each time a page is evicted from the cache.

10. A system, comprising:
    a plurality of nodes each comprising:
    a memory comprising a cache; and a processing device communicably coupled to the memory; and a memory management module executable from the plurality of nodes, the memory management module to:

reference an entry of a data structure of a first cache of a first node of the plurality of nodes to identify a stored value of a global eviction counter, the stored value of the global eviction counter stored in the entry when a page of a file previously stored in the first cache was evicted from the first cache, wherein the first node originates a request for the page from a processing device of the first node; and calculating a first local refault distance of the page of the file in view of the stored value, a current value of the global eviction counter, and a current value of a first local eviction counter associated with the first node.

11. The system of claim 10, wherein the memory management module further to, when the first local refault distance is smaller than or equal to a number of pages that a size of a probationary list of the first cache can increase, adjust a ratio of a protected list of the first cache and the probationary list of the first cache in view of the determined first local refault distance, wherein the number of pages that the size of the probationary list of the first cache can increase is equal to a size of the protected list of the first cache.

12. The system of claim 11, wherein the memory management module further to:

increase the probationary list of the first cache by at least one entry by moving at least one entry at a tail of the protected list of the first cache to a head of the probationary list of the first cache; and adding an entry for the page to the head of the probationary list of the first cache.

13. The system of claim 11, wherein the memory management module further to:

when the first local refault distance is greater than the number of pages that the size of the probationary list of the first cache can increase, calculating a second local refault distance of the page of the file in view of the value of the stored value, the current value of the global eviction counter, and a current value of a second local eviction counter associated with a second node of the plurality of nodes, wherein the second node is a neighboring node to the first node that originated the request for the page; and when the second local refault distance is smaller than a number of pages that a size of a probationary list of a second cache of the second node can increase, adjust a ratio of a protected list of the second cache and the probationary list of the second cache in view of the determined second local refault distance, wherein the number of pages that the size of the probationary list of the second cache can increase is equal to a size of the protected list of the second cache.

14. The system of claim 13, wherein the memory management module further to:

increase the probationary list of the second cache by at least one entry by moving at least one entry at a tail of the protected list of the second cache to a head of the probationary list of the second cache; and adding an entry for the page to the head of the probationary list of the second cache.

15. The system of claim 10, wherein the first local refault distance indicates a number of pages that were evicted from the first cache in between the eviction of the page and a faulting of the page back into the first cache.

16. The system of claim 10, wherein the memory management module further to decay the first local eviction counter at a rate that results in a higher weight placed on recent evictions from the first cache of the first node and a lower weight placed on older evictions from the first cache of the first node.

17. A non-transitory machine-readable storage medium including data that, when accessed by a processing device, cause the processing device to:

reference, by the processing device, an entry of a data structure of a cache in memory to identify a stored value of an eviction counter, the stored value of the eviction counter stored in the entry when a page of a file previously stored in the cache was evicted from the cache;

determine, by the processing device, a refault distance of the page of the file in view of a difference between the stored value and a current value of the eviction counter;

when the refault distance is smaller than or equal to a number of pages that a size of a probationary list of the cache can increase, increase, by the processing device, a size of the probationary list by at least one entry by moving at least one entry at a tail of a protected list of the cache to a head of the probationary list; and add, by the processing device, an entry for the page to the head of the probationary list.

18. The non-transitory machine-readable storage medium of claim 17, wherein the refault distance indicates a number of pages that were evicted from the cache in between the eviction of the page and a faulting of the page back into the cache.

19. The non-transitory machine-readable storage medium of claim 17, wherein when the refault distance is greater than the number of pages that the size of the probationary list can increase, leaving the ratio of the protected list and the probationary list at a current state.

20. The non-transitory machine-readable storage medium of claim 17, wherein the data structure of the cache is a tree data structure, and wherein an offset of the page in the file is used as an index into the tree data structure to reference the entry for the page.

* * * * *